No. 863,666.
PATENTED AUG. 20, 1907.
E. J. ST. CROIX.
FLUID DISTRIBUTING APPARATUS.
APPLICATION FILED APR. 19, 1906.
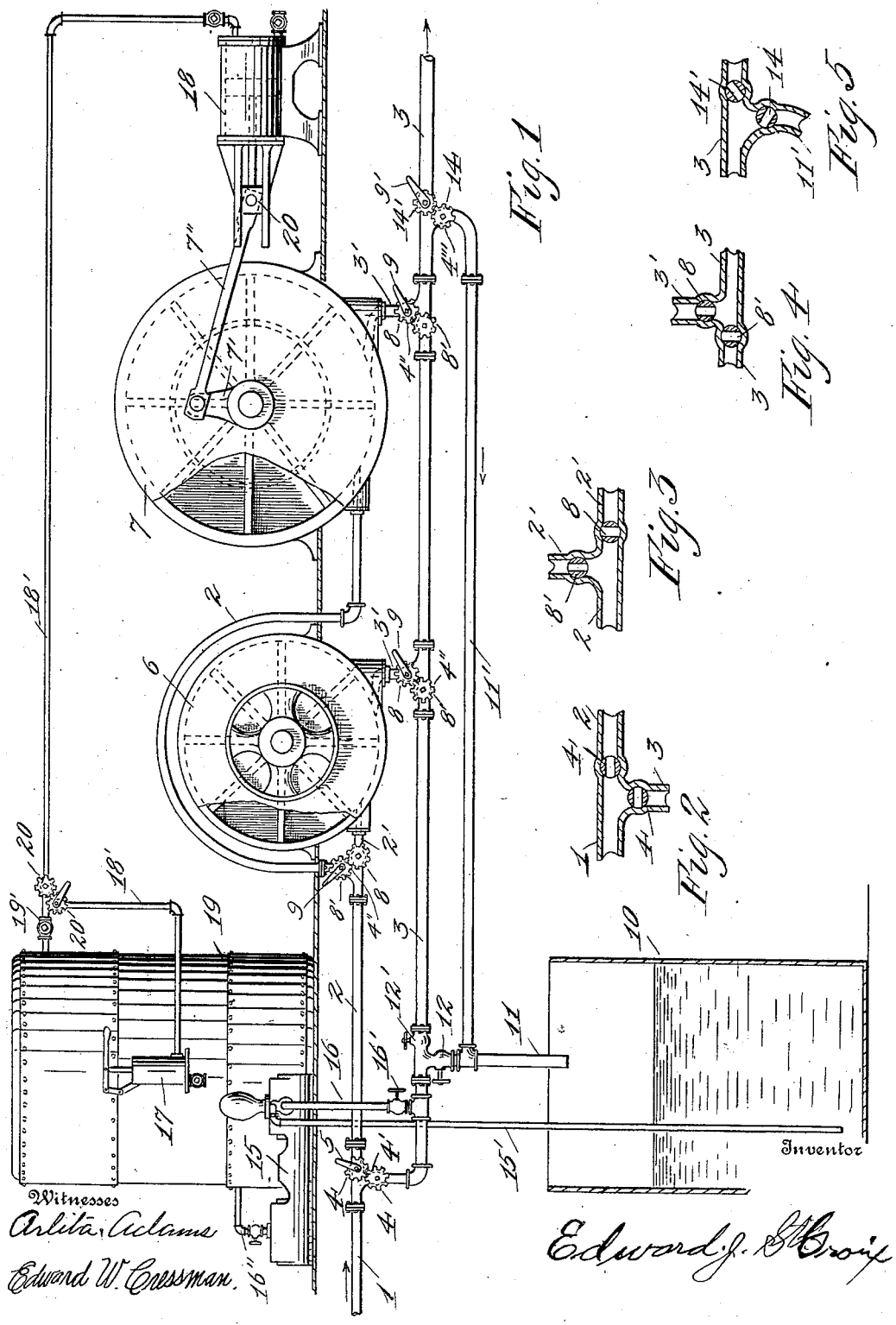

UNITED STATES PATENT OFFICE.

EDWARD J. ST. CROIX, OF SEATTLE, WASHINGTON.

FLUID-DISTRIBUTING APPARATUS.

No. 863,666.   Specification of Letters Patent.   Patented Aug. 20, 1907.

Application filed April 19, 1906. Serial No. 312,702.

*To all whom it may concern:*

Be it known that I, EDWARD J. ST. CROIX, a citizen of the United States of America, and a resident of the city of Seattle, in the county of King and State of Washington, have invented certain new and useful Improvements in Fluid-Distributing Apparatus, of which the following is a specification.

My invention has reference to fluid distributing apparatus especially useful in connection with water power plants where the motive fluid is also employed for sluicing or similar work.

The primary object of the invention is the provision of simple and efficient distributing apparatus for use in connection with plants of the above nature, whereby fluctuations in the volume of water in the main supply can be compensated for in sluicing by diverting and storing water when the volume is in excess of the demand and transmitted from storage when the volume is less than that required for sluicing.

With the above and other objects in view, referred to in the following, my invention resides in combinations and arrangements of parts as set forth in this specification and defined in the appended claims.

With reference to the accompanying drawing, in which similar reference numerals designate corresponding parts throughout: Figure 1 is a view in side elevation disclosing my invention in connection with a water power plant, and Figs. 2, 3, 4 and 5 are sectional views of details.

Reference numeral 1 designates a feed pipe leading from any suitable source for supplying water under pressure, and 2 and 3 designate distributing pipes connected with said feed pipe, the pipe 3 leading to the point of sluicing and each pipe being provided with a suitable cut-off valve 4 (see Fig. 2.) The valves 4 are preferably connected for simultaneous operation by a pair of gears 4′ secured each to the stem of a respective valve, and the relative arrangement of the valves is such that when one is open the other is closed. Thus by proper adjustment of the valves the full volume of fluid in the feed pipe can be directed to either one of the distributing pipes or a portion thereof directed to each as desired, the said adjustment being effected through the medium of a handle 5 secured to the stem of one of the valves.

Reference numerals 6 and 7 indicate suitable fluid operated motors of the rotary type for distributing power to various machinery about the plant and which motors have their intake passages connected with pipe 2 and their discharge passages connected with pipe 3, the latter connections being made by means of branch pipes 3′ leading each from its respective discharge passage to pipe 3, while the intake passage of motor 7 is directly connected with pipe 2 and the intake passage of motor 6 connected with said last pipe by means of a branch pipe 2′.

The branch pipes 2′ and 3′ are each provided with a cut-off valve, as 8 (see Figs. 3 and 4) and similar valves 8′ are located in the pipes 2 and 3 each adjacent a respective one of said branch pipes, the valve 8′ in pipe 2 being located beyond the branch 2′ so that fluid admitted to said pipe can be directed to either motor as desired, and the valves 8′ in pipe 3 being each located forwardly of its respective branch 3′. Each valve 8 is preferably connected with its companion valve 8′ by means of a pair of gears 4″, and a handle, as 9 is secured to the stem of one of said valves, so that they can be adjusted simultaneously.

At a convenient point I provide a suitable receptacle, as 10 for storing water, which receptacle may be in the nature of an excavation or consist of a tank as shown. Leading to this receptacle is a spill pipe 11 having connection with pipe 3 forwardly of the branch pipes 3′ and having a branch 11′ connected with pipe 3 beyond said branch pipes 3′.

The spill pipe 11 is provided with a cut-off valve 12 located above the pipe 11′ and a similar valve 12′ is located in pipe 3 just beyond said spill pipe, while a cut off valve 14 is located in said spill pipe 11′ and a similar valve 14′ provided in pipe 3 beyond its point of connection with spill pipe 11′ (see Fig. 5), The valves 14 and 14′ are preferably connected by a pair of gears 4‴ for simultaneous operation by means of a handle 9′ secured to the stem of one of said valves.

In connection with receptacle 10 I provide suitable means for transmitting fluid therefrom to pipe 3. The said means including an ordinary fluid operated pump 15 connected with a suction pipe 15′ leading from said receptacle and with a delivery pipe 16 leading to pipe 3, and having a cut-off valve 16′.

To supply fluid for operating pump 15 I employ air compressors 17 and 18, and provide a suitable air receiver 19 connected with the pump by means of a supply pipe 16″. Air is passed from said compressors through respective delivery pipes 18′ leading to a check valve 19′ connected with the receiver, each pipe having a cut-off valve 20. The compressor 17 is preferably of the normally operative type while compressor 18 is connected with motor 7 for operation through the medium of a crank 7′ secured to the motor shaft and a connecting rod 7″ engaged with said crank and the cross head 20 of the compressor.

When desired to apply the entire volume of water passing through pipe 1 for operating motor 6 the valves 4 are set to direct the water to pipe 2 and the valves 8 of the intake and discharge passages of said motor opened and their companion valves closed. The valve 8 at the discharge passage of motor 7 is closed and its companion valve 8′ opened so that the water discharging from motor 6 will have free passage through said valve 8′.

The receiver 19 is normally kept charged with compressed air through the medium of compressor 18 which is operated at convenient periods by directing the water in pipe 2 to operate motor 7, the valves 8 and 8′ at the discharge passage of this motor being respectively opened and closed, and the valves 8 and 8′ at the intake passage of motor 6 being respectively closed and opened at such times.

In case the entire volume of water discharging from either motor is required for sluicing purposes valve 14′ is opened and valve 14 closed. If, however, but a portion of the volume is required for this purpose the valves 14′ and 14 are both set in partly open positions so that a portion of the volume is permitted to pass through the spill pipes 11′ and 11 to receptacle 10 for storage or if desired the full volume may be directed to storage by closing valve 14′ and opening valve 14.

If desired to utilize the full volume of water for sluicing without operating the motors the valves 4 are set to direct the water to pipe 3 and the valve 12′, 8′ and 14′ in said pipe opened while valve 12 in spill pipe 11 is closed. If desired the full volume of water may be directed to receptacle 10 by closing valve 12′ and opening valve 12 or a portion passed to said receptacle and a portion directed for sluicing by partly opening both of said valves.

When the supply of water for any reason runs low or is entirely cut off as oftentimes happens the sluicing operations can be continued by transmitting water from storage to pipe 3. This being effected by opening valve 16′ and operating pump 15 through the medium of compressed air from receiver 19. The air pressure during such times being maintained by operating compressor 17 manually.

Having thus described my invention, what I claim as new, and desire to secure by Letters Patent of the United States of America, is:—

1. In a fluid distributing apparatus, a feed pipe for conveying water from a source of supply, a plurality of distributing pipes connected with said feed pipe, means for directing water from the feed pipe to either one of said distributing pipes, fluid operated means connected with one of said last pipes for intake and with another one thereof for discharge, a receptacle connected with one of said distributing pipes, for receiving water therefrom, means for controlling the flow from said last pipe to the receptacle, and means for transmitting water from said receptacle to the distributing pipe that receives the discharge from said fluid operated means.

2. In a fluid distributing apparatus, a feed pipe for conveying water from a source of supply, a plurality of distributing pipes connected therewith, means for directing water from the feed pipe to either one of said distributing pipes, fluid operated means connected with one of said last pipes for intake and to a second one thereof for discharge, a receptacle, a spill pipe leading to said receptacle from the said second distributing pipe beyond the point of connection of said fluid operated means therewith, means for directing the fluid past said spill pipe or thereinto, and means for transmitting fluid from said receptacle to one of said distributing pipes.

3. In a fluid distributing apparatus, a feed pipe for conveying water under pressure from a source of supply, a plurality of distributing pipes connected with said feed pipe, means for directing fluid to either one of said distributing pipes, a receptacle for storing water, a plurality of spill pipes leading from one of said distributing pipes at different points to said receptacle, fluid operated means connected for discharge with said last distributing pipe between said spill pipes and with another one of said distributing pipes for intake, cut off valves for said spill pipes, and means for transmitting water from said receptacle to one of said distributing pipes.

4. The combination with a fluid operated motor, of a feed pipe, a distributing pipe connected with said feed pipe and with the intake passage of said motor, a second distributing pipe connected with the feed pipe and with the discharge passage of the motor, means for directing fluid from said feed pipe to either one of said distributing pipes, a receptacle for fluid, an air receiver, an air compressor operatively connected with said motor and discharging into said receiver, a second manually operated air compressor also discharging into said receiver, and fluid operated means connected with said receiver for transmitting fluid from said receptacle to one of said distributing pipes.

5. In a fluid distributing system, a feed pipe from a source of supply, a pair of distributing pipes connected therewith, means for directing fluid to either of said distributing pipes, a fluid operated motor attached to one of said distributing pipes and discharging into the second distributing pipe, a branch pipe leading from the second distributing pipe to a storage tank, valve-means in the second distributing pipe in advance of the motor discharge, and valve-means in the second distributing pipe beyond the motor discharge, either of said valve-means being adapted to direct all or a portion of the fluid from the second distributing pipe to the storage tank.

6. In a fluid distributing system, a feed-pipe from a source of supply, a pair of distributing pipes connected therewith, means for directing fluid to either of said distributing pipes, a fluid operated motor attached to one distributing pipe and discharging into the other or second distributing pipe, a branch pipe leading to a storage tank, valve-means in the second distributing pipe in advance of the motor discharge and valve-means in the second distributing pipe beyond the motor discharge, either of said valve-means being adapted to direct all or a portion of the fluid from the second distributing pipe to the storage tank, an air receiver, an air compressor operated by the motor, for supplying air to the receiver, and a fluid operated means connected with said receiver to transmit water from the storage tank to the second discharge pipe at a point in advance of the first mentioned valve-means.

Signed at Seattle, Washington, this 13 day of April, 1906.

EDWARD J. ST. CROIX.

Witnesses:
  G. G. ENGLAND,
  MARIE ENGLAND.